United States Patent [19]
Sackowitz

[11] Patent Number: 5,797,285
[45] Date of Patent: Aug. 25, 1998

[54] DEVICE FOR LOCKING ROTATABLE SHAFTS HAVING STOP PLATES

[76] Inventor: Ronald Allan Sackowitz, 161 Disbrow Hill Rd., Hightstown, N.J. 08520

[21] Appl. No.: 834,909

[22] Filed: Apr. 7, 1997

[51] Int. Cl.⁶ .................................................. F16K 35/10
[52] U.S. Cl. .................. 70/177; 70/180; 70/212; 70/232; 70/DIG. 57; 137/385; 251/112
[58] Field of Search ............................. 70/177, 178, 180, 70/212, DIG. 57, 14, 232, 164, 166, 174–176, 179, 183, 187, 203, 211, 229; 137/385; 251/112

[56] References Cited

U.S. PATENT DOCUMENTS

| | | | |
|---|---|---|---|
| 209,181 | 10/1878 | Miller | 70/178 |
| 1,099,280 | 6/1914 | Connolly | 251/112 X |
| 1,231,164 | 6/1917 | Jahns et al. | 251/112 X |
| 1,934,327 | 11/1933 | Ridder | 70/178 |
| 1,993,784 | 3/1935 | Henderson | 70/180 |
| 2,979,076 | 4/1961 | Kish | 137/385 |
| 4,444,031 | 4/1984 | Watson | 70/DIG. 57 X |
| 5,058,622 | 10/1991 | Chitty, Jr. et al. | 137/385 |

FOREIGN PATENT DOCUMENTS 2168131  6/1986  United Kingdom ............. 137/385

*Primary Examiner*—Lloyd A. Gall
*Attorney, Agent, or Firm*—Mathews, Collins, Shepherd & Gould, P.A.

[57] ABSTRACT

A locking device for a valve having a rotatable shaft including a stop plate, and a stop secured to a housing, including a hollow body having a first chamber for receiving the shaft, a threaded aperture extending into the first chamber for receiving a screw, a second chamber surrounding the screw, a lockable closure preventing access to the screw, and a tab coupled to the hollow body adapted to be received between the stop plate and the stop.

5 Claims, 1 Drawing Sheet

U.S. Patent     Aug. 25, 1998     5,797,285

DEVICE FOR LOCKING ROTATABLE SHAFTS HAVING STOP PLATES

FIELD OF THE INVENTION

This invention relates to locking devices and, in particular, to a device for locking rotatable shafts, such as valve stems, having stop plates.

BACKGROUND OF THE INVENTION

A variety of mechanical devices employ rotatable shafts in arrangements designed for discrete rotations. For example, a quarter turn ball valve has a rotatable stem with two operating positions which can be taken as 0° for the open position and 90° for the closed position. To ensure rotation of the stem to a proper operating position, some manufacturers include a stop plate on the stem and a pair of stops or bosses secured to the valve housing. Rotation of the stem to the 90° closed position encounters a first stop. Reverse rotation to the 0° open position encounters the second stop.

In a number of applications it is desirable to lock such a device in a chosen position. For example, ball valves can control the flow of fluids such as steam, petroleum products, or hazardous chemicals or gases. Safety concerns dictate that a valve closed against the flow of such materials should not be subject to casual or unintended opening. Accordingly there is a need for devices capable of locking rotatable shafts.

SUMMARY OF THE INVENTION

The present invention is a device for locking a rotatable shaft, such as a valve stem, having a stop plate and preset position stops. The device comprises, in essence, a hollow body having a first chamber for peripherally surrounding the shaft, a locking tab for insertion between the stop plate and a stop, and a locking screw threadably engaging the body for locking the body in axial position on the shaft. A second chamber extending radially outward from the first can peripherally surround the locking screw. A closure, such as a padlock, can be provided for blocking access to the locking screw. When the locking tab is inserted and the locking screw is engaged, the shaft cannot be rotated.

BRIEF DESCRIPTION OF THE DRAWINGS

The nature, advantages and various additional features of the invention will appear more fully upon consideration of the illustrative embodiments now to be described in detail in connection with the accompanying drawing. The drawing is an exploded perspective view of a locking device in accordance with the invention. It is to be understood that this drawing illustrates the concepts of the invention and is not to scale.

DETAILED DESCRIPTION

Figure 1:
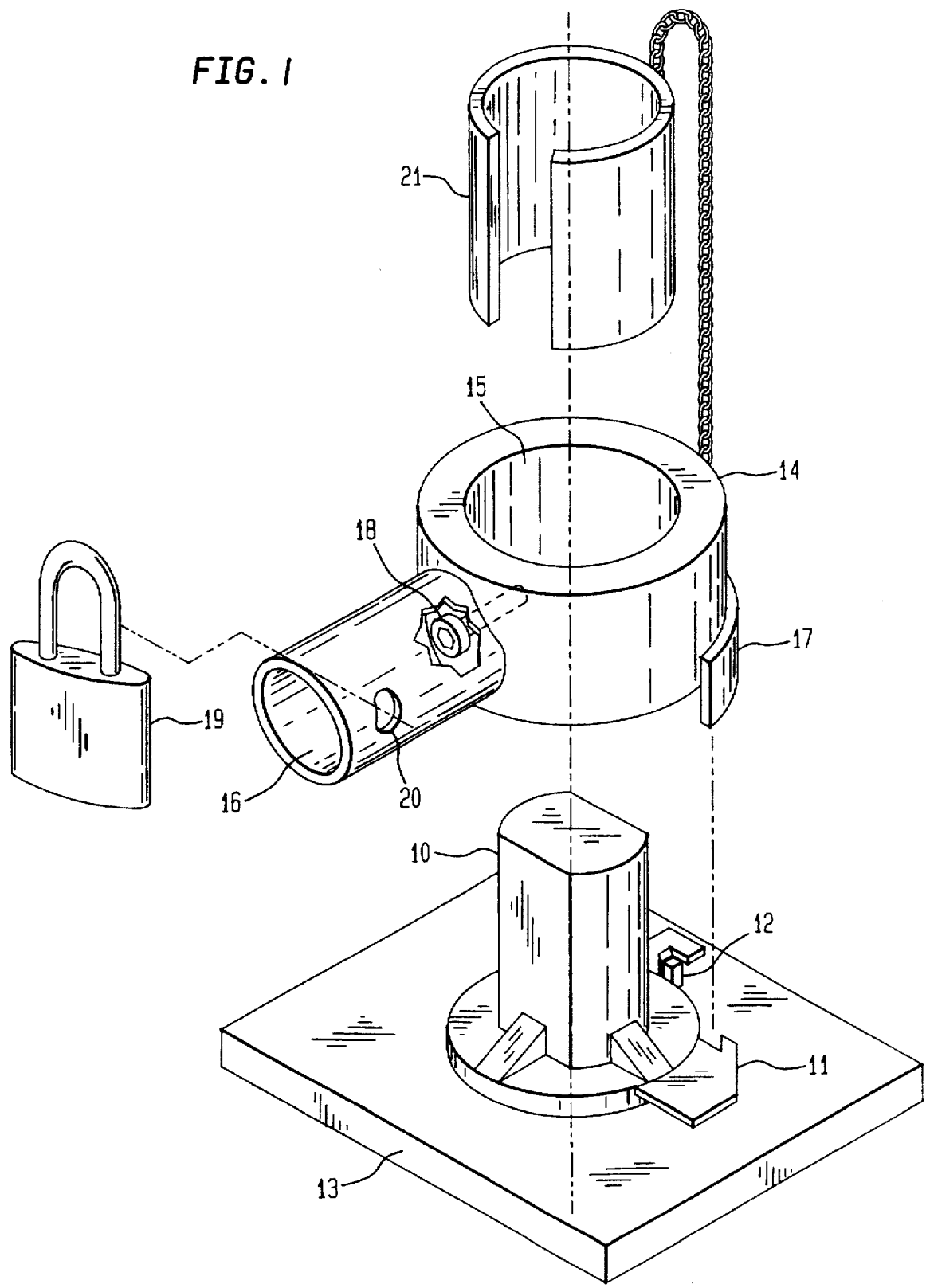

The drawing is an exploded perspective view of a device to lock the rotational position of a shaft 10 having an affixed stop plate 11 in relation to a stop 12 secured to a housing as by a plate 13. In the preferred application of the invention, the shaft is the stem of a quarter turn ball valve (not shown) to which plate 13 is secured.

The locking device comprises a hollow body 14 having first and second chambers 15, 16 and a locking tab 17. The first chamber 15 encompasses the shaft 10 so that the body 14 peripherally surrounds the shaft. This circumscribing makes it very difficult to apply a tool, such as a stem wrench, to the shaft. Locking tab 17 inserts between stop plate 11 and stop 12 to prevent rotation of the shaft. For a 90° separation between plate 11 and stop 12, tab 17 will typically occupy about 85°.

The body 14 includes a threaded opening communicating with chamber 15 through which a threaded locking screw 18 engages body 14 and radially presses against shaft 10 to lock the body 14 in axial position on the shaft. The screw 18 is preferably a socket-head cap screw.

The second chamber 16 extends radially from the first chamber and encompasses the radially outer portion of screw 18 including the head. Chamber 16 is provided with a closure, such as a padlock 19 fitting through holes 20 to preclude access to the screw head.

Optionally an adapter sleeve 21 can be provided with the device to permit use of the device with smaller shafts. The adapter fits within chamber 15 to fill space between body 14 and the shaft 10.

In use, body 14 is fitted over the shaft 10 and rotated so that locking tab 17 inserts between plate 11 and stop 12. Screw 18 is then threaded tightly against the shaft 10, and padlock 19 is locked in position to prevent removal of the screw. The device is thus locked in position on the shaft, and the tab prevents rotation of the shaft.

In the preferred embodiment, body 14 comprises a first carbon steel hollow circular cylinder. The cylinder is radially drilled and threaded, and a second hollow circular steel cylinder defining chamber 16 is welded around the screw hole. The second cylinder extends radially outward from the first cylinder. The second cylinder is provided with openings on opposed sides for receiving the padlock 19. Tab 17, also steel, is welded to the lower periphery of the first cylinder. It extends axially below the first cylinder around a sector of the cylinder.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed:

1. A locking device for locking a valve having a rotatable shaft with a stop plate secured thereto, and a stop, said stop secured to a housing, said locking device comprising:

a hollow body having a first chamber, a threaded aperture extending into said first chamber, and a second chamber extending radially from said first chamber;

said hollow body is attachable to said shaft to peripherally surround said shaft;

a locking tab coupled to said hollow body, said locking tab comprises a tab extending axially below said body around a sector thereof, said locking tab adapted for fitting between said stop plate and said stop when said first chamber is positioned around said shaft to block rotation of said shaft;

a screw threadedly received through said second chamber when said first chamber is positioned around said shaft, said second chamber peripherally surrounding a radially outer portion of said screw when said screw is received therein, said screw engaging said threaded aperture and adapted to press against said shaft for locking said body in an axial position on said shaft; and a lockable closure coupled to said second chamber, wherein said lockable closure and said second chamber prevent access to said screw.

2. The locking device according to claim 1 wherein said first chamber comprises a first hollow circular cylinder.

3. The locking device according to claim 2 wherein said second chamber comprises a second hollow circular cylinder.

4. The locking device according to claim 3 wherein said second hollow circular cylinder is provided with openings on opposed sides of said second hollow circular cylinder and said lockable closure comprises a padlock for insertion through said openings.

5. The locking device according to claim 4 further comprising an adapter sleeve, said adapter sleeve is attachable between said first chamber and said shaft to fill space between said body and said shaft.

* * * * *